A. PARKER.
PROCESS FOR THE CONSERVATION OF WATER.
APPLICATION FILED MAY 25, 1918.

1,320,907.

Patented Nov. 4, 1919.

Witnesses
R. A. Thomas
L. B. Middleton.

Inventor
Alexander Parker

By Victor J. Evans
Attorney

UNITED STATES PATENT OFFICE.

ALEXANDER PARKER, OF ETNA MILLS, CALIFORNIA.

PROCESS FOR THE CONSERVATION OF WATER.

1,320,907.   Specification of Letters Patent.   Patented Nov. 4, 1919.

Application filed May 25, 1918. Serial No. 236,597.

*To all whom it may concern:*

Be it known that I, ALEXANDER PARKER, a citizen of the United States, residing at Etna Mills, in the county of Siskiyou and State of California, have invented new and useful Improvements in Processes for the Conservation of Water, of which the following is a specification.

This invention relates to new and improved systems for the conservation of water for use in reclamation projects and the like.

In carrying out my invention I provide means for spraying water over an area of any desired extent, when the temperature is below freezing so that the water will accumulate in the form of ice and cover the area to any desired thickness. When the weather becomes warm the ice may be covered by saw-dust or any other non-conducting material so that the ice will slowly melt and thus provide a supply of water for irrigation or other purposes.

In describing my invention in detail, reference will be had to the accompanying drawings wherein like characters denote like or corresponding parts throughout the several views, and in which:—

Figures 1, 2:
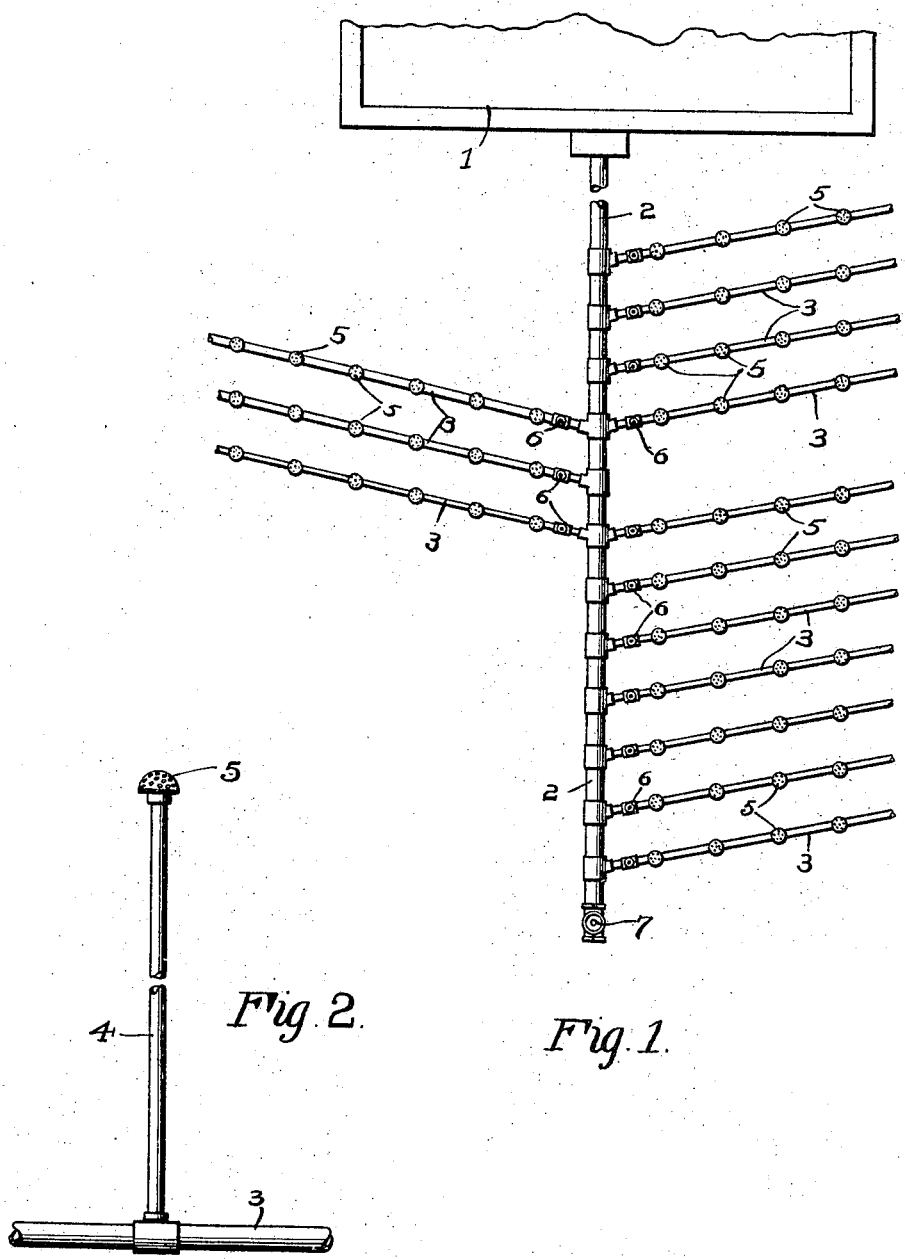
Figure 1 is a diagrammatic view showing one manner of carrying out my invention.
Fig. 2 is a view of one of the stand pipes of the system.

As shown in Fig. 1, I locate a dam, indicated by the reference numeral 1 at a suitable point along a stream so as to force the water, or part thereof, of the said stream through a main pipe 2. Branch pipes 3 are connected with the main pipe and each of these branch pipes is provided with one or more stand pipes 4. Each of these stand pipes is provided with a spray cap 5 so that the water passing through the pipe will be sprayed in fine streams in all directions. Each branch pipe is provided with a valve 6 at a point where it joins the main pipe and the main pipe is provided with a valve 7 at its end so that the water may be allowed to run to waste or the said valve may be closed and the water forced through the branch pipes and sprayed therefrom.

When the temperature drops below freezing the valves are set so that the water will be sprayed from the stand pipes and will thus quickly freeze and cover the ground around the system. This is kept up as long as the freezing temperature prevails or until sufficient ice is collected. The ice may be covered with suitable non-conducting material to prevent it from melting too rapidly.

Suitable conduits are provided for carrying off the water from the melting ice to the point where the water is to be used. By placing my systems in rocky areas where there is no grazing land, all of such grazing lands may be used and not covered with water as in the case where the water is stored in reservoirs formed by dams or the like.

The main pipe and lateral pipes are so placed that the water will drain therefrom when the system is not in use and thus prevent the pipes from being bursted by the water freezing therein. My system is adapted to be placed at high altitudes where the snowfall remains well into the summer and as snow melts more quickly than ice, it will be seen that my system will continue to furnish water long after the snow has melted.

It is thought from the foregoing description that the advantages and novel features of my invention will be readily apparent.

I desire it to be understood that I may make such changes in the construction and in the combination and arrangement of the several parts, provided that such changes fall within the scope of the appended claim.

What I claim is:—

A process for the conservation of water in arid regions, comprising slowly discharging the water over certain areas of land when the temperature is below the freezing point, so that the water will accumulate as ice and gradually melt when the temperature rises sufficiently to furnish water for irrigation purposes.

In testimony whereof I affix my signature.

ALEXANDER PARKER.

Copies of this patent may be obtained for five cents each, by addressing the "Commissioner of Patents, Washington, D. C."